US012367634B2

(12) United States Patent
Velentzas et al.

(10) Patent No.: US 12,367,634 B2
(45) Date of Patent: *Jul. 22, 2025

(54) ALLOCATION OF RESOURCES TO TASKS

(71) Applicant: Imagination Technologies Limited, Kings Langley (GB)

(72) Inventors: Panagiotis Velentzas, Hertfordshire (GB); John W. Howson, Hertfordshire (GB); Richard Broadhurst, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,733

(22) Filed: Apr. 18, 2024

(65) Prior Publication Data

US 2024/0273804 A1 Aug. 15, 2024

Related U.S. Application Data

(63) Continuation of application No. 17/680,947, filed on Feb. 25, 2022, now Pat. No. 11,989,816.

(30) Foreign Application Priority Data

Feb. 25, 2021 (EP) .................................... 21386017

(51) Int. Cl.
*G06T 15/00* (2011.01)
*G06F 9/50* (2006.01)

(52) U.S. Cl.
CPC .......... *G06T 15/005* (2013.01); *G06F 9/5016* (2013.01)

(58) Field of Classification Search
CPC . G06T 15/05; G06T 15/00; G06T 1/20; G06F 9/5016; G06F 9/462; G06F 9/4881; G06F 9/5011; G06F 2209/507
(Continued)

(56) References Cited

U.S. PATENT DOCUMENTS 4,493,020 A 1/1985 Kim et al.
6,757,897 B1 6/2004 Shi et al.
(Continued)

OTHER PUBLICATIONS

Lin et al., "Enabling Efficient Preemption for SIMT Architectures with Lightweight Context Switching," IEEE 2016 Int'l Conference for High Performance Computing, Networking, Storage and Analysis, Nov. 13, 2016, pp. 898-908 (note: NPL in parent application).

*Primary Examiner* — Prabodh M Dharia
(74) *Attorney, Agent, or Firm* — Potomac Law Group, PLLC; Vincent M DeLuca

(57) ABSTRACT

A method of managing resources in a graphics processing pipeline includes, in response to selecting a task for execution within a texture/shading unit, allocating to the task both a static allocation of temporary registers for the entire task and a dynamic allocation of temporary registers. The dynamic allocation comprises temporary registers used by a first phase of the task only and the static allocation of temporary registers comprises any temporary registers that are used by the program and are live at a boundary between two phases. When the task subsequently reaches a boundary between two phases, the dynamic allocation of temporary registers are freed and a new dynamic allocation of temporary registers for a next phase of the task is allocated to the task.

18 Claims, 11 Drawing Sheets

(58) Field of Classification Search
USPC .................. 345/519, 506, 522; 712/E9.05
See application file for complete search history.

(56) References Cited

U.S. PATENT DOCUMENTS

| | | | |
|---|---|---|---|
| 7,528,843 | B1 | 5/2009 | Kilgard et al. |
| 2002/0144092 | A1* | 10/2002 | Topham .................. G06F 9/325 |
| | | | 712/E9.05 |
| 2005/0193278 | A1 | 9/2005 | Hammarlund et al. |
| 2005/0193306 | A1 | 9/2005 | Luff et al. |
| 2008/0071910 | A1 | 3/2008 | Thukral |
| 2009/0133029 | A1 | 5/2009 | Varadarajan et al. |
| 2009/0225689 | A1 | 9/2009 | Yu |
| 2011/0261063 | A1* | 10/2011 | Jiao ........................ G06F 9/3004 |
| | | | 345/522 |
| 2013/0117758 | A1 | 5/2013 | Cuadra et al. |
| 2014/0118373 | A1 | 5/2014 | Hakura et al. |
| 2014/0325521 | A1 | 10/2014 | Li et al. |
| 2015/0067356 | A1 | 3/2015 | Trichy Ravi et al. |
| 2015/0178879 | A1* | 6/2015 | Palmer ....................... G06T 1/20 |
| | | | 345/506 |
| 2015/0319741 | A1 | 11/2015 | Li et al. |
| 2016/0140686 | A1 | 5/2016 | Lueh et al. |
| 2016/0328236 | A1 | 11/2016 | Kamatsuka |
| 2018/0096446 | A1 | 4/2018 | Chen et al. |
| 2018/0275991 | A1* | 9/2018 | Khorasani ............ G06F 9/30076 |
| 2018/0308215 | A1* | 10/2018 | Veernapu ............ G06F 12/0875 |
| 2018/0308277 | A1 | 10/2018 | Surti et al. |
| 2019/0087188 | A1 | 3/2019 | Vaidyanathan et al. |
| 2019/0114205 | A1 | 4/2019 | Kloosterman et al. |
| 2020/0303060 | A1 | 9/2020 | Haemel et al. |
| 2020/0379820 | A1 | 12/2020 | Dutu et al. |

* cited by examiner

ALLOCATION OF RESOURCES TO TASKS

CROSS-REFERENCE TO RELATED APPLICATIONS AND CLAIM OF PRIORITY

This application is a continuation under 35 U.S.C. 120 of copending application Ser. No. 17/680,947 filed Feb. 25, 2022, now U.S. Pat. No. 11,989,816, which claims foreign priority under 35 U.S.C. 119 from European Patent Application No. 21386017.4 filed Feb. 25, 2021, the contents of which are incorporated by reference herein in their entirety.

BACKGROUND

There are a number of different ways of rendering 3D scenes, including tile-based rendering and immediate-mode rendering. In a graphics processing system that uses tile-based rendering, the rendering space is divided into one or more tiles (e.g. rectangular areas) and the rendering is then performed tile-by-tile. This typically increases the rendering speed as well as reducing the framebuffer memory bandwidth required, the amount of on-chip storage required for hidden surface removal (HSR) and the power consumed.

Irrespective of whether tile-based or immediate-mode rendering is used, the rendering process involves the execution of many tasks in parallel. Execution of a task may involve operations, such as texture fetches, which are typically followed by long delays (e.g. due to the time taken to access memory) and this can reduce the efficiency and throughput of the graphics processing pipeline unless mitigating steps are taken.

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of managing resources in a graphics processing pipeline is described. The method comprises, in response to selecting a task for execution within a texture/shading unit, allocating to the task both a static allocation of temporary registers for the entire task and a dynamic allocation of temporary registers. The dynamic allocation comprises temporary registers used by a first phase of the task only and the static allocation of temporary registers comprises any temporary registers that are used by the program and are live at a boundary between two phases. When the task subsequently reaches a boundary between two phases, the dynamic allocation of temporary registers are freed and a new dynamic allocation of temporary registers for a next phase of the task is allocated to the task.

A first aspect provides a method of managing resources in a graphics processing pipeline, the method comprising: in response to selecting a task for execution within a texture/shading unit, allocating to the task a static allocation of temporary registers for the entire task and a dynamic allocation of temporary registers for a first phase of the task only, wherein the task executes a program comprising a plurality of phases and wherein the static allocation of temporary registers comprises any temporary registers that are live at a boundary between two phases; and when the task reaches a boundary between two phases, freeing the dynamic allocation of temporary registers and allocating to the task a new dynamic allocation of temporary registers for a next phase of the task.

A second aspect provides a method of sub-dividing a program into a plurality of phases, the method comprising: analysing instructions in the program to identify one or more phase boundaries based on usage of temporary registers when executed; and for an identified phase boundary, inserting a phase instruction into the program.

A third aspect provides a texture/shading unit for use in a graphics processing pipeline, the texture/shading unit comprising: hardware logic arranged in response to selecting a task for execution, to allocate to the task a static allocation of temporary registers for the entire task and a dynamic allocation of temporary registers for a first phase of the task only, wherein the task executes a program comprising a plurality of phases and wherein the static allocation of temporary registers comprises any temporary registers that are live at a boundary between two phases; and wherein the hardware logic is further arranged, when the task reaches a boundary between two phases, to free the dynamic allocation of temporary registers and allocate to the task a new dynamic allocation of temporary registers for a next phase of the task.

A fourth aspect provides a graphics processing system comprising the texture/shading unit described herein. A fifth aspect provides a graphics processing system configured to perform a method as described herein. The graphics processing system may be embodied in hardware on an integrated circuit.

A sixth aspect provides a computer readable code configured to cause a method as described herein to be performed when the code is run. A seventh aspect provides a computer readable storage medium having encoded thereon the computer readable code.

The texture/shading unit or graphics processing system comprising the texture/shading unit may be embodied in hardware on an integrated circuit. There may be provided a method of manufacturing, at an integrated circuit manufacturing system, a texture/shading unit or graphics processing system comprising the texture/shading unit. There may be provided an integrated circuit definition dataset that, when processed in an integrated circuit manufacturing system, configures the system to manufacture a texture/shading unit or graphics processing system comprising the texture/shading unit. There may be provided a non-transitory computer readable storage medium having stored thereon a computer readable description of an integrated circuit that, when processed, causes a layout processing system to generate a circuit layout description used in an integrated circuit manufacturing system to manufacture a texture/shading unit or graphics processing system comprising the texture/shading unit.

There may be provided an integrated circuit manufacturing system comprising: a non-transitory computer readable storage medium having stored thereon a computer readable integrated circuit description that describes the texture/shading unit or graphics processing system comprising the texture/shading unit; a layout processing system configured to process the integrated circuit description so as to generate a circuit layout description of an integrated circuit embodying the texture/shading unit or graphics processing system comprising the texture/shading unit; and an integrated circuit generation system configured to manufacture the texture/shading unit or graphics processing system comprising the texture/shading unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
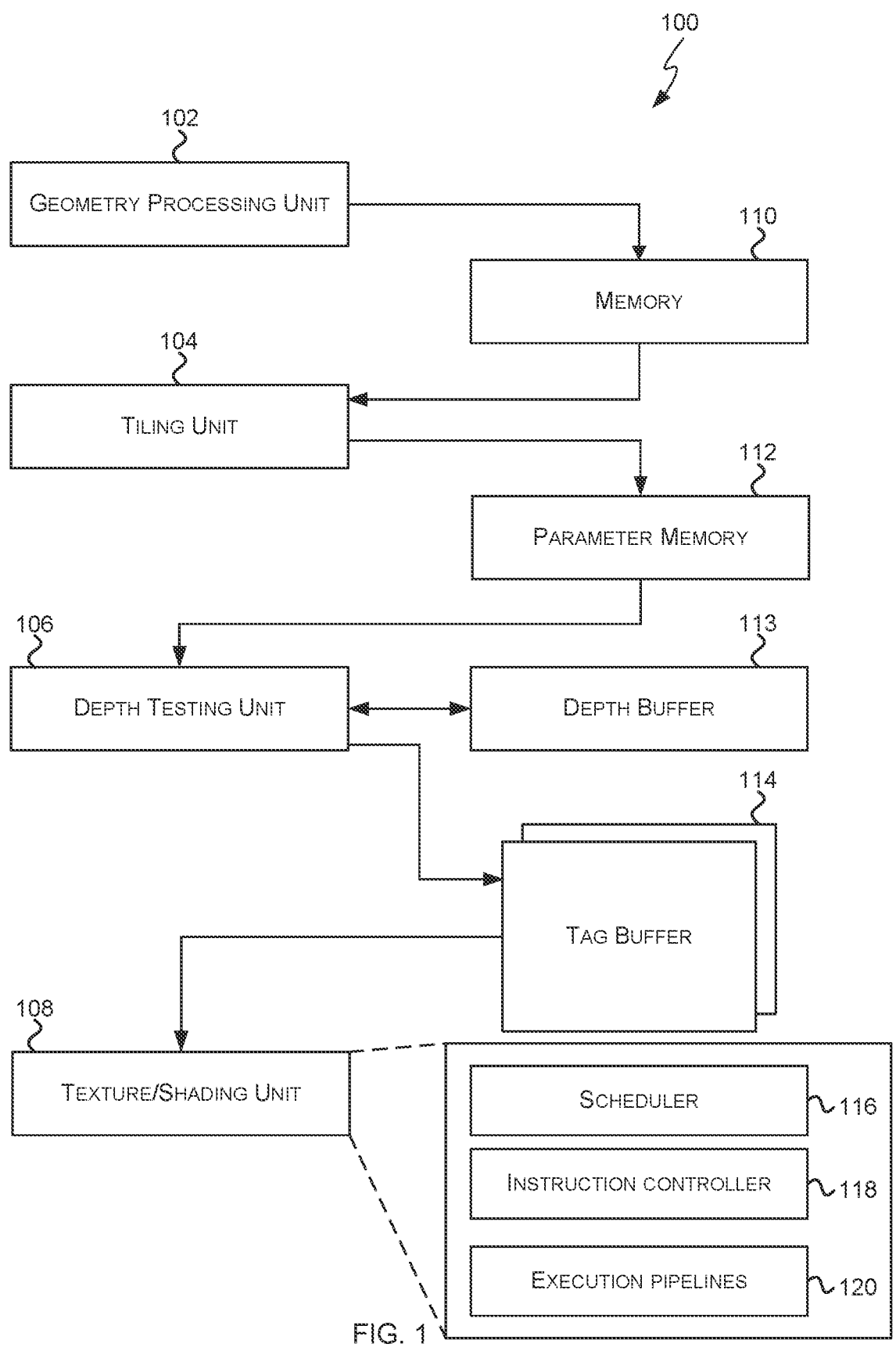
FIG. 1 shows a schematic diagram of an example graphics pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows a schematic diagram of an example graphics processing unit (GPU) pipeline 100 which may be implemented in hardware within a GPU and which uses a tile-based rendering approach. As shown in FIG. 1, the pipeline 100 comprises a geometry processing unit 102, a tiling unit 104, a depth testing unit 106 (which may also be referred to as a hidden surface removal unit) and a texturing/shading unit (TSU) 108. The pipeline 100 also comprises one or more memories and buffers, such as a first memory 110, a second memory 112 (which may be referred to as parameter memory), a depth buffer 113 and one or more tag buffers 114. Some of these memories and buffers may be implemented on-chip (e.g. on the same piece of silicon as some or all of the GPU 102, tiling unit 104, depth testing unit 106 and TSU 108) and others may be implemented separately. It will be appreciated that the pipeline 100 may comprise other elements not shown in FIG. 1.

The geometry processing unit 102 receives image geometrical data for an application and transforms it into domain space (e.g. UV coordinates) as well as performs tessellation, where required. The operations performed by the graphics processing unit 102, aside from tessellation, comprise per-vertex transformations on vertex attributes (where position is just one of these attributes) performed by a vertex shader and these operations may also be referred to as 'transform and lighting' (or 'transform and shading'). The geometry processing unit 102 may, for example, comprise a tessellation unit and a vertex shader, and outputs data which is stored in memory 110. This data that is output may comprise primitive data, where the primitive data may comprise a plurality of vertex indices (e.g. three vertex indices) for each primitive and a buffer of vertex data (e.g. for each vertex, a UV coordinate and in various examples, other vertex attributes). Where indexing is not used, the primitive data may comprise a plurality of domain vertices (e.g. three domain vertices) for each primitive, where a domain vertex may comprise only a UV coordinate or may comprise a UV coordinate plus other parameters (e.g. a displacement factor and optionally, parent UV coordinates).

The tiling unit 104 reads the data generated by the geometry processing unit 102 (e.g. by a tessellation unit within the geometry processing unit 102) from memory 110, generates per-tile display lists and outputs these to the parameter memory 112. Each per-tile display list identifies, for a particular tile, those primitives which are at least partially located within, or overlap with, that tile. These display lists may be generated by the tiling unit 104 using a tiling algorithm. Subsequent elements within the GPU pipeline, such as the depth testing unit 106, can then read the data from parameter memory 112. The back end of the tiling unit 104 may also group primitives into primitive blocks.

The depth testing unit 106 accesses the per-tile display lists from the parameter memory 112 and performs depth tests on fragments of the primitives in the tile (where the term 'fragment' is used herein to refer to an element of a primitive at a sample position). Current depth values (which may be referred to as 'depth state') may be stored in and accessed from the depth buffer 113. If the depth test unit 106 determines that a fragment contributes to the image data, then one or more identifiers associated with the fragment, each referred to as a tag, are written to the tag buffer 114. The one or more identifiers may comprise a tag that identifies the primitive and a tag that identifies the primitive block that the primitive is part of. If, however, the fragment is found not to contribute to the image data (e.g. because its depth indicates that the fragment is further away than, or is occluded by, an opaque fragment, which may be referred to as an occluder, that is already stored in the tag buffer), then the tag associated with the fragment is not written to the tag buffer 114.

The tag buffer 114 holds tags for the fragments from the front-most primitives (i.e. those closest to the viewpoint, which may also be referred to as 'near-most') for each sample position in a tile. To store a tag for a fragment in the tag buffer 114, an identifier for the primitive of which the fragment is part is stored in a location that corresponds to the fragment and there is a 1:1 association between fragments and positions in the tag buffer. A fragment is therefore defined by the combination of the primitive identifier (or tag) and the position at which that identifier is stored in the tag buffer. The action of storing a fragment in the tag buffer therefore refers to the storing of the identifier for the primitive of which the fragment is part in a location in the tag buffer that corresponds to the sample position of the fragment.

The texturing/shading unit (TSU) 108 performs texturing and/or shading tasks. The term 'task' is used herein to refer to a group of one or more data-items (e.g. pixels or samples) and the work that is to be performed upon those data-items (where this 'work' may be a program that is executed). For example, a task may comprise or be associated with a program or reference to a program (e.g. a shader) in addition to a set of data that is to be processed according to the program, where this set of data may comprise one or more data-items. The term 'instance' (or 'program instance') is used herein to refer to individual instances that take a path through the code. An instance therefore refers to a single data-item (e.g. a single fragment or pixel, where in the context of the methods described herein, a fragment becomes a pixel when it has updated the output buffer, which may alternatively be known as the on-chip frame buffer or partition store) and a reference (e.g. pointer) to a program (e.g. a shader) which will be executed on the data-item. A task therefore comprises one or more instances and typically comprises a plurality of instances. In the context of the methods described herein, nearly all instances (e.g. except for the end of tile instance) correspond to a fragment.

Tasks are generated when the tag buffer 114 is flushed through to the TSU 108. There are a number of situations which trigger the flushing of the tag buffer 114. When the tag buffer 114 is flushed, tasks are formed by scanning out (or gathering) data relating to fragments from the tag buffer 114 and placing them into tasks (with each fragment corresponding to a separate instance, as described above). The maximum number of instances (and hence fragments) within a task is limited by the width of SIMD structure in the graphics architecture. The efficiency of the TSU 108 (and hence the graphics pipeline 100) is increased by filling tasks as full as possible; however, there are also a number of constraints that control how fragments are packed into tasks. In current systems, the group of tasks that are generated by a single tag buffer flush operation are collectively referred to as a pass and the TSU 108 implements mechanisms that ensure that all tasks from a pass finish updating the depth buffer (e.g. do a late depth-test or feedback to the depth test after alpha testing) before any of the tasks from the next pass. This ensures that pixels are processed in the correct order and avoids hazards, such as reads or writes being performed out of order. However, the efficiency of the pipeline is reduced where tasks in the pass are not fully occupied (i.e. they contain fewer than the maximum number of instances) and the impact of this increases as the width of the SIMD structure increases (e.g. there is a bigger impact for a 128-wide SIMD structure than a 32-wide SIMD structure). Typically, at least the last task in a pass will not be fully occupied (e.g. in a pipeline with a SIMD width of 128, the last task will typically contain less than 128 instances).

As shown in FIG. 1, there may be more than one tag buffer 114. This enables two operations to be implemented in parallel: (i) scanning out data from a first tag buffer that has been flushed to form tasks and (ii) storing (or accumulating) tags into a second tag buffer. This parallel operation, which may be referred to as 'double-buffering', improves the efficiency of operation of the pipeline 100 as it is not necessary to wait for the flushing (i.e. operation (i)) to be complete before writing more tags into a tag buffer (i.e. operation (ii)).

As also shown in FIG. 1, the TSU 108 may comprise a scheduler 116, an instruction controller 118 and one or more execution pipelines 120. It will be appreciated that the GPU pipeline 100 may comprise elements in addition to those shown in FIG. 1 and the TSU 108 may comprise elements in addition to (or instead of any of) the scheduler 116, the instruction controller 118 and the execution pipelines 120.

As described above, execution of a task within the TSU 108 may involve operations, such as texture fetches or external memory fetches, which are typically followed by long delays (e.g. due to the memory latency which is not predictable and to the other operations involved in texture fetches, such as filtering/interpolation) and this can reduce the efficiency and throughput of the graphics processing pipeline 100 unless mitigating steps are taken. Techniques that may be used to hide the delay include de-scheduling the task to enable execution of other tasks (e.g. tasks from other threads), e.g. using a de-scheduling fence. A de-scheduled task still has resources allocated to it which enables it to be resumed quickly when the data returns. Whilst de-scheduling a task may enable another task to be executed (i.e. because another task can be in an ACTIVE state and there is a limit on the total number of tasks that can be in the ACTIVE state), a situation may be reached where there are no further tasks that are available to be selected for execution (e.g. there may be no tasks that are in a READY state). This is because prior to starting execution of a task, the resources required for execution of the task need to be allocated to that task. These resources may comprise some or all of: temporary registers, storage for task state, such as a task ID, predicates, the program counter (PC), reference counters, fence counters, SD masks/counters, etc. If a lot of resources are already allocated to both executing tasks and de-scheduled tasks, there may be insufficient available (i.e. unallocated) resources to allocate to another task.

For the purposes of the following description, tasks which have been scheduled for execution within the TSU may be in one of a number of different states. A task in a READY state has the necessary resources allocated to it and sequential dependencies met and is able to be selected for execution. When a task in the READY state is selected for execution within the TSU it moves from the READY state to the ACTIVE state. If a task that is executing (and hence in the ACTIVE state) is subsequently de-scheduled (e.g. because it reaches an instruction that is followed by a long delay, such as a texture fetch), then it is no longer in the ACTIVE state but it cannot be placed into the READY state until the reason for the de-scheduling has been removed, e.g. if a task is de-scheduled following a texture fetch, it cannot become READY until the data returns in response to the texture fetch. As described above, a de-scheduled task still has the resources allocated to it, so that once the data returns, the task can be immediately placed back into the READY state without delay.

Described herein are various methods of managing resources (within the GPU pipeline 100) that are allocated to tasks and the methods may be implemented within the TSU 108 and/or by control hardware that is located outside the TSU 108 but affects the operation of the TSU 108. For example, the methods described herein may be implemented by the scheduler 116 and instruction controller 118 within the TSU 108. As described above, these resources may comprise some or all of: temporary registers, storage for predicates and the program counter (PC), etc. Each of the methods described herein may be used independently or in combination with one or more of the other methods described herein. By using one or more of the methods described herein, the amount of resource that is allocated to tasks that cannot currently be executed is reduced and hence the overall maximum number of tasks that are either available for selection for execution (i.e. are in the READY state) or being executed (i.e. are in the ACTIVE state) is increased (e.g. compared to known systems). This improves the efficiency of the TSU 108 (and hence of the GPU pipeline 100) as it reduces the likelihood that resource limitations will cause a situation where the execution pipelines within the TSU 108 are under-utilised because there are too few tasks being available for execution or being executed. Put in another way, the use of the methods described herein reduce the likelihood that resource constraints will mean there are no tasks in the READY state when a TSU is being under-utilised.

The methods of managing resources described herein involve the division of a program that is executed within the TSU 108 into a plurality of phases and this may be implemented by the addition of one or more special instructions (referred to herein as PHASE instructions). These special instructions, which define phase boundaries and hence segment the program into phases, may be added as part of static analysis of the program code, for example, when the program is compiled by a compiler. In addition, one or more of the phase boundaries may be skipped as the program is executed (thereby merging adjacent phases), based on analysis performed by the hardware (e.g. within the TSU 108) as the program is executed. In other examples, the phase boundaries may be defined in any other way.

Also described herein are methods of compiling programs executed within the TSU 108 to more efficiently manage resources within the GPU pipeline 100. A compiler may implement one or more of these methods.

Phase boundaries within a program (e.g. within a shader program) may be defined at points in the code that are followed by delays which are long or potentially long (e.g. longer than average actual or potential delays). These points may, for example, be after high-latency instructions (e.g. texel fetch operations) and/or where the program waits for sequential dependencies (SDs) to clear, e.g. before output buffer writes (OBW) and DISCARD instructions (which define fragments that are not drawn). DISCARD instructions may result in a long delay because before a DISCARD is executed, the sequential dependencies are checked to make sure that a previous pass (i.e. all tasks in the previous pass) has concluded writing to the depth buffer and this may be implemented using a mutex on the depth buffer. Similarly, before an instruction which writes to an output buffer (OBW), the sequential dependencies are checked to make sure that a previous pass (i.e. all tasks in the previous pass) has concluded writing to the output buffer.

Figure 2:
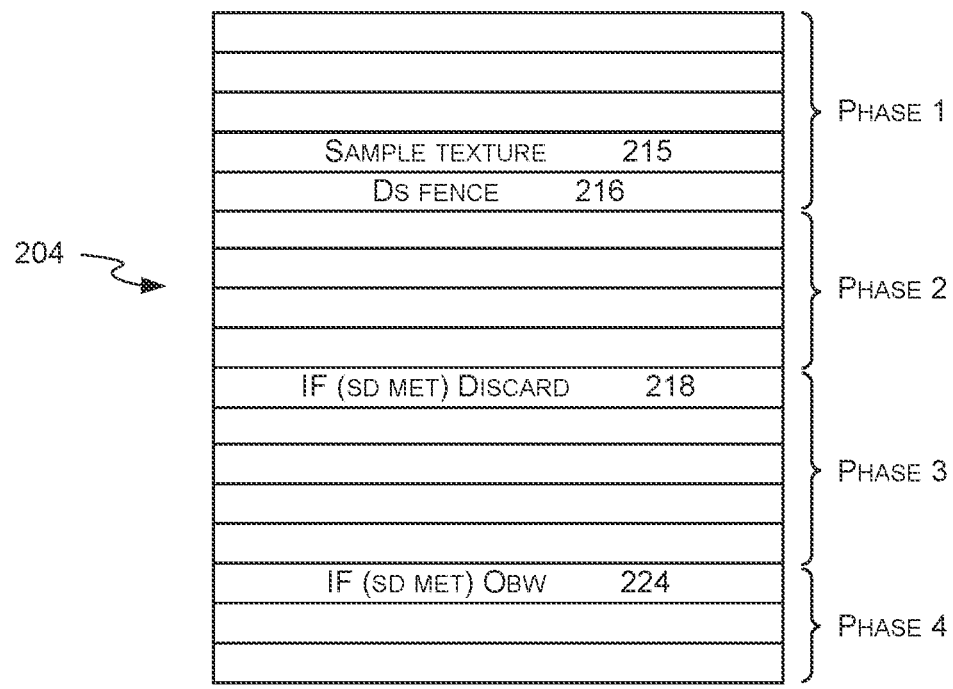
FIG. 2 shows an example program that has been divided into four phases through the identification of three phase boundaries.

FIG. 2 shows an example program 204 that has been divided into four phases through the identification of three phase boundaries. In the example program 204, phase boundaries are positioned after a de-scheduling (DS) fence 216 (which follows a texture fetch instruction 215), before a DISCARD instruction 218 and before a write to an output buffer (OBW) 224.

Whilst in the example of FIG. 2, the programs is divided into four phases, in other examples programs may be divided into more than four phases or fewer than four phases (e.g. where only a subset of the instructions shown in FIG. 2 are present in the program code). In various examples, every pixel shader may be divided into at least two phases as a pixel shader will always comprise an instruction that writes to an output buffer (OBW), and in some examples the program will be divided into exactly two phases.

Positions of phase boundaries within a program (e.g. within a shader program) may in addition, or instead, be defined based on other criteria, such as the number of live temporary registers (where a temporary register is considered to be live if data has been written to it but has not yet been read for the last time) and further examples are described below with reference to FIG. 6.

As described above, the position of a phase boundary within a program may be identified by the addition of a special instruction, referred to herein as a PHASE instruction. In addition, or instead, the position of a phase boundary may be identified by adding a field in an existing instruction.

Figure 3:
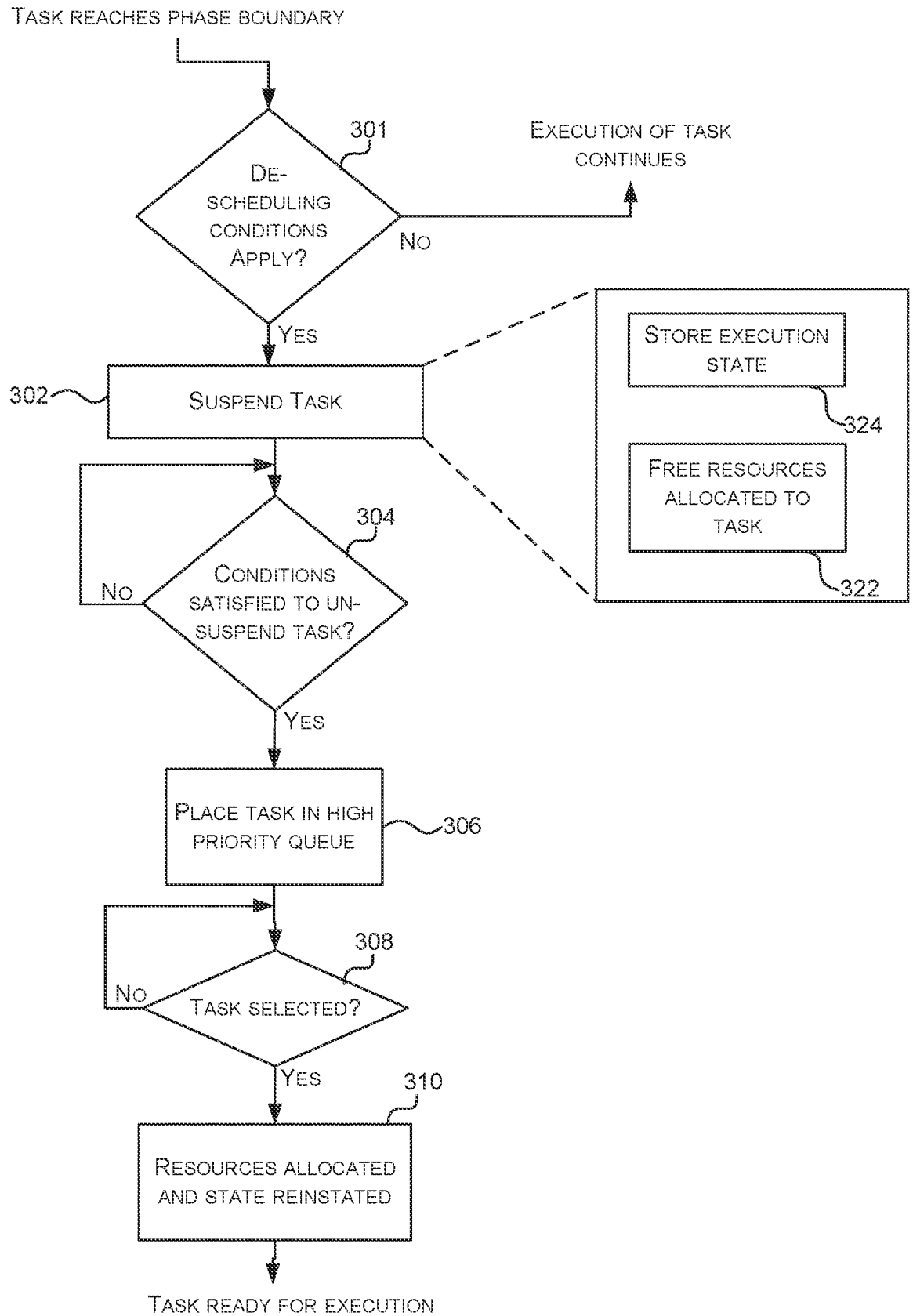
FIG. 3 shows a first example method of managing resources within a GPU pipeline.

A first example method of managing resources within a GPU pipeline can be described with reference to FIG. 3. As described above, execution of a task comprises executing a program (e.g. a shader) for a set of data items (e.g. pixels or samples) and when the task is being executed, it is referred to as being in an ACTIVE state. As shown in FIG. 3, when the execution of a task reaches a phase boundary, it is determined whether de-scheduling conditions apply (block 301) and if so, the task is suspended (block 302). If, however, the de-scheduling conditions do not apply ('No' in block 301), then the phase boundary is ignored and execution of the task continues. These de-scheduling conditions may be related to the reason for the placement of the particular phase boundary. As described above, a phase boundary may be placed at a point in the code where there is potential for a long delay. Consequently, if at the point the task reaches the phase boundary, the cause of the potential long delay does not exist (e.g. required data has already been returned), then the de-scheduling conditions do not apply and execution of the task can continue uninterrupted.

When a task is in a suspended state, it not in the same state as a de-scheduled task because a de-scheduled task retains all the resources that were allocated to the task prior to its execution (and to enable its execution), whereas resources allocated to a task are freed (i.e. de-allocated) when the task is suspended (block 322).

The task remains in the suspended state until pre-defined conditions are satisfied ('Yes' in block 304). The particular conditions that need to be satisfied for a task will depend on the nature of the phase boundary, i.e. they will depend upon the instruction that resulted in the phase boundary. For example, where the phase boundary is placed following an instruction to fetch data (e.g. a texture fetch), then the conditions (in block 304) will be satisfied when the data returns. Alternatively, where the phase boundary is placed where sequential dependencies or fences need to clear (e.g. before a DISCARD or OBW instruction), then the conditions (in block 304) will be satisfied when the sequential dependencies or fence are cleared.

As described above, as resources are freed when a task is suspended, there are more available (i.e. unallocated) resources for allocation to other tasks which are otherwise ready to be executed (e.g. all their sequential dependencies have been met) and this means that the freed resources can be used to place another task into the READY state. Once a task is in the READY state, it can be selected for execution (and hence enter the ACTIVE state).

When a task is suspended, as well as freeing the allocated resources (block 322), execution state for the task is stored (block 324). This execution state comprises the state required to restart the task from the point after the phase boundary and this may include all the values that were stored in temporary registers that were live at the phase boundary or, in some implementations, all the values that were stored in any temporary registers allocated to the task if any of the allocated temporary registers are live at the phase boundary. A temporary register is considered to be live if data has been written to it but has not yet been read for the last time. The execution state that is stored (in block 324) also comprises data that records the progress of the task prior to suspension (e.g. the task state, which may comprise the task ID, program counter, predicates, reference counters, fence counters, SD masks/counters, etc.).

When the conditions are satisfied to restore a suspended task ('Yes' in block 304), the task cannot immediately commence execution, or be placed into the READY state, because (unlike a de-allocated task) it does not have any resources allocated to it. The task may be placed into a high-priority queue (block 306) such that resources are allocated to the task in preference to another task that has not yet started execution. When the task is selected from the high-priority queue ('Yes' in block 308), resources are allocated to the task and the task state is restored (block 310) using the information that was previously stored (in block 324). The restoration of task state therefore comprises writing the stored values of temporary registers to newly allocated temporary registers. At this point the task is placed into the READY state and can be selected for execution when there is capacity within the execution pipelines (e.g. when the number of tasks in the ACTIVE state falls below a pre-defined limit).

Where a task is suspended (in block 302) as a consequence of a phase boundary that is immediately before a DISCARD or write to output buffer (OBW), once the task resumes execution, the DISCARD/OBW instruction can be executed immediately because the sequential dependency will have been met (as this has been checked before the task exited the suspended state, in block 304).

As described above, the methods described herein may be implemented by the scheduler 116 and instruction controller 118 within the TSU 108. For example, in FIG. 3, the instruction controller 118 may determine whether de-scheduling conditions apply (block 301) and then suspend the task if required (blocks 302, 322, 324) and the scheduler 116 may determine whether to un-suspend a task (block 304) and the subsequent operations (blocks 306, 308, 310).

Figure 4:
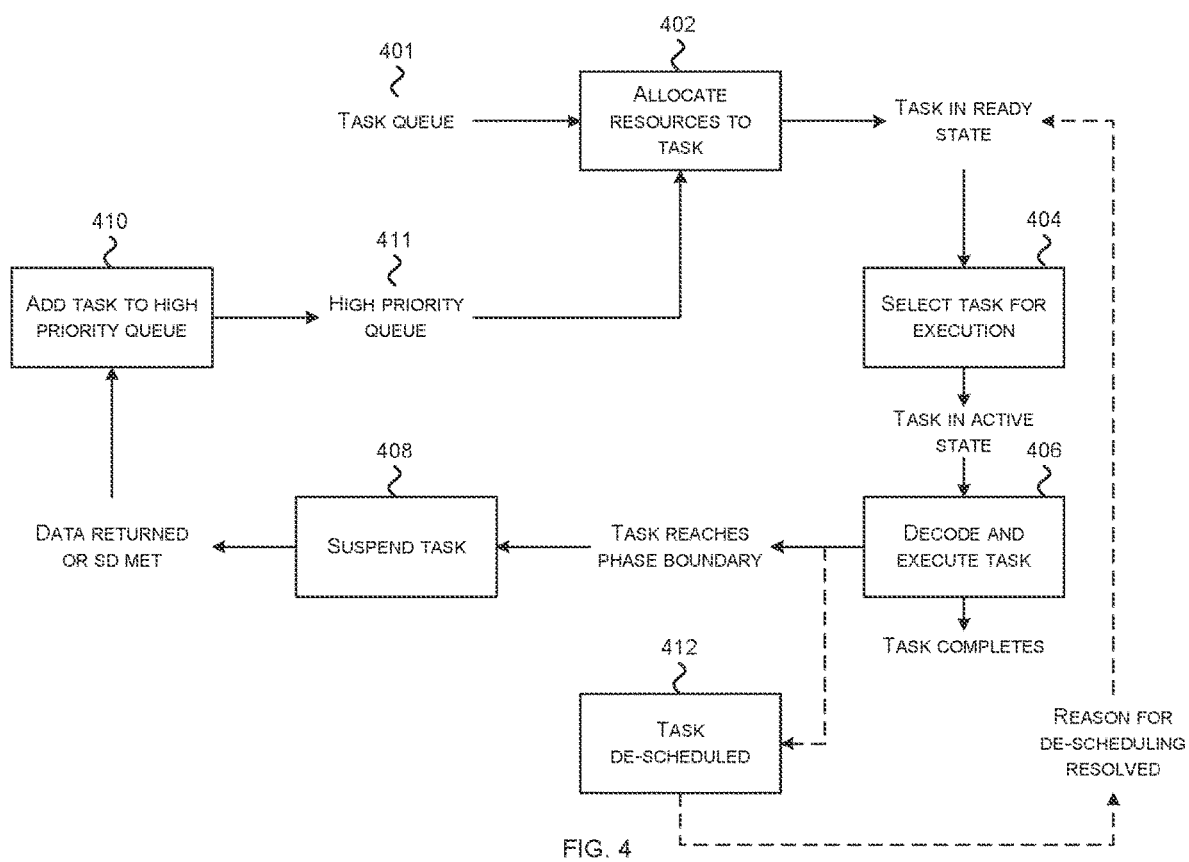
FIG. 4 shows a representation of the execution cycle of a task.

The method of FIG. 3 can be described in the broader context of a task's execution with reference to the example execution cycle shown in FIG. 4. New tasks that have been scheduled for execution, but have not yet been executed, are initially placed in a task queue 401. When a task is selected from the task queue 401, resources are allocated to the task (block 402) and assuming that all dependencies are met, the task is then placed into the READY state. A task that is in the READY state is available for selection for execution and so, having been placed into the READY state, a task will subsequently be selected for execution (block 404). At this point, the task is in the ACTIVE state and the instructions in the task are decoded and executed (block 406).

If a phase boundary is reached, the task is suspended (block 408) until the data that has been requested prior to the phase boundary is returned or the sequential dependency that is outstanding at the phase boundary is met. At this point, the task is added to a high-priority queue 411 (block 410) and is available for selection for allocation of resources once again (in block 402). Unlike a new task, when resources are allocated to a task selected from the high-priority queue 411 (in block 402), the task state is also restored based on stored task execution state, and then the cycle continues as described above until the task completes. As described above, tasks are preferentially selected from the high priority queue 411 for resource allocation (in block 402), rather than selecting tasks from the input task queue 401.

FIG. 4 also shows how the suspending of a task differs from the de-scheduling of a task and in various example implementations, there may be both suspended tasks and de-scheduled tasks (as described below). As shown in FIG. 4, if a task is de-scheduled (block 412), it does not need to return to the allocation stage (of block 402) once the reason for the de-scheduling has been resolved, but instead a de-scheduled task can return immediately to the READY state as its resources remain allocated to it (as indicated by the dotted arrow that leaves block 412).

As shown in FIG. 4, a de-scheduled task can return to the READY state, and hence continue execution, more quickly than a suspended task; however, a de-scheduled task uses resources (which may be scarce) even whilst de-scheduled which may prevent other tasks (e.g. other tasks from the task queue 401) being allocated resources and hence prevent them from becoming READY and then ACTIVE. One or more techniques may be used, however, to reduce the time taken for a suspended task to return to the READY state once the reason for the suspension has been resolved. For example, by placing a task that has emerged from being suspended into a high-priority queue 411 (in block 410), the time taken to restart execution of the task may be reduced (compared to not providing any priority to the allocation of resources in block 402) and the time taken can be further reduced by prioritising the selection of a previously suspended task for execution over a new task (in block 404). This prioritisation may, for example, be implemented by adding the previously suspended task to the front of a queue of READY tasks (which gives the task the highest possible priority) or by adding the previously suspended task into the queue of READY tasks according to the age of the task (where the age corresponds to the time since the task was first made READY). The task at the front of the queue of READY tasks may be the first to be selected for execution (in block 404) and therefore the degree of prioritisation can be adjusted by use of different rules to determine the position at which the previously suspended task is added to the queue of READY tasks. In other examples, there may be two queues of READY tasks—one for new tasks that have not previously executed and the other for tasks that were previously suspended (in a similar manner to the two task queues 401, 411) and tasks may be preferentially selected for execution from the queue of READY tasks that were previously suspended.

In some implementations, tasks may only be suspended and no tasks are de-scheduled; however, in other implementations, some tasks may be de-scheduled (e.g. on reaching a de-scheduling fence) and others may be suspended (e.g. on reaching a phase boundary). The suspension or de-scheduling of a task may be pre-defined based on static analysis of the code at compile time. In addition, a GPU pipeline may also switch dynamically between a mode where tasks are only de-scheduled (e.g. where execution resources are limited but storage resources are not) and a mode where tasks are only suspended (e.g. where storage resources are limited but execution resources are not or where the texel fetch pipeline is overwhelmed which will increase the time taken for texel data to return). In some implementations, limits may be set such that there is a maximum number of tasks that can be de-scheduled (e.g. when they reach a de-scheduling fence) and once that limit has been reached, subsequent tasks that reach a phase boundary are instead suspended. In such an implementation, the maximum number of tasks that can be de-scheduled at any time may be pre-defined (and fixed) or may be set dynamically (e.g. at run time).

In FIG. 4, for example, the instruction controller 118 (within the TSU 108) may perform the decoding of tasks (in block 406) and the de-scheduling and suspending of tasks (in blocks 408 and 412). The two queues 401, 411 may be located within the scheduler 116 which may add tasks to the high priority queue 411 (in block 410), allocate resources to tasks (in block 402) and select tasks for execution (in block 404).

Figure 5:
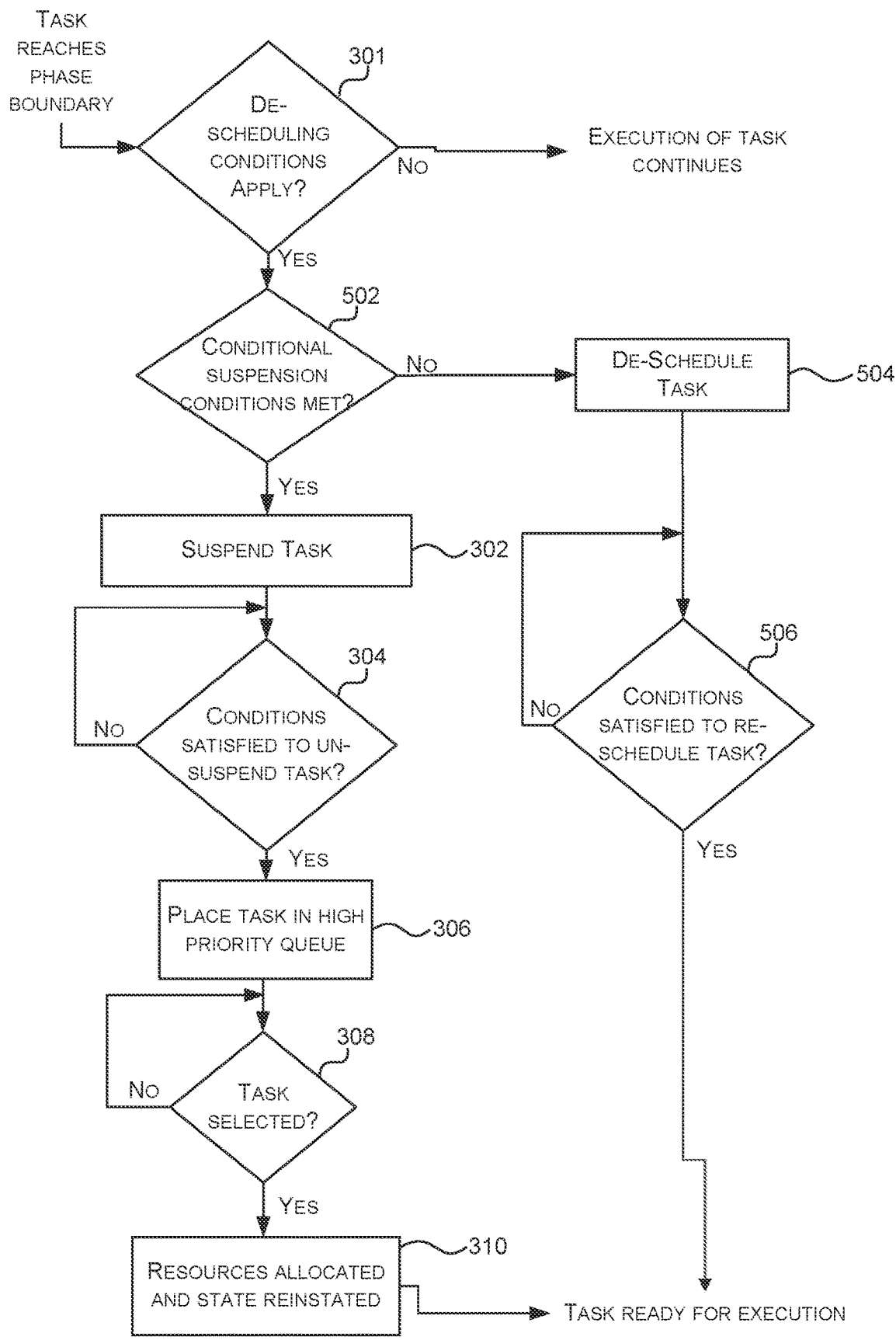
FIG. 5 shows another example method of managing resources within a GPU pipeline which is a variation of the method of FIG. 3.

FIG. 5 shows a variation on the flow diagram of FIG. 3 in which the suspending of tasks is conditional. As shown in FIG. 5, when a task reaches a phase boundary it is determined whether conditions are met to suspend, rather than de-schedule, the task (block 502). These conditions may, for example, be based on the current status of the execution pipelines in the TSU 108 (e.g. the current utilisation of the execution pipelines). If the conditions are satisfied ('Yes' in block 502), then the task is suspended (block 302) and the method continues as described above with reference to FIG. 3. If, however, the conditions are not satisfied ('No' in block 502), then the task is de-scheduled (block 504). This means that as soon as conditions are satisfied to re-schedule the task ('Yes' in block 506), e.g. data returns or a sequential dependency is met, the task is immediately ready to be selected for execution. The conditions for re-scheduling a task (as assessed in block 506) may be the same as the conditions for removing a task from the suspended state (as assessed in block 304).

In FIG. 5, for example, the instruction controller 118 (in the TSU 108) may determine whether de-scheduling conditions apply (in block 301), whether suspension conditions are met (in block 502) and then suspend or de-schedule the task if required (in blocks 302, 504). The scheduler 116 may determine whether to un-suspend a task (block 304) and the subsequent operations (blocks 306, 308, 310) and also whether conditions are satisfied to re-schedule a task (in block 506).

Whilst the above description refers to the suspending of tasks, the tasks may alternatively be described as hibernated or phased out.

By using the methods of FIGS. 3-5, the execution of a task can be stopped and then restarted without holding onto the resources allocated to the task in the intervening period. This enables an increase in the utilisation of the execution pipelines within the TSU 108 without requiring significant additional infrastructure (e.g. additional storage, additional scheduling resource, etc.) and hence without introducing a substantial silicon area overhead. Alternatively, these methods may be used to provide the same level of performance but in a smaller area of silicon (e.g. as a consequence of providing less storage, less scheduling resource, etc.).

As described above (with reference to FIG. 2), phase boundaries within a program (e.g. within a shader program) may be defined at points in the code that are followed by delays which are long or potentially long (e.g. longer than average actual or potential delays). In addition, or instead, phase boundaries may be positioned based on other criteria, such as the use of registers within the code. For example, the positions of phase boundaries may be based on the number of live temporary registers, where a temporary register is considered to be live if data has been written to it but has not yet been read for the last time. In various examples, phase boundaries may be defined at points in the code to reduce (or minimise) a number of temporary registers that are live at any phase boundary.

Figure 6:
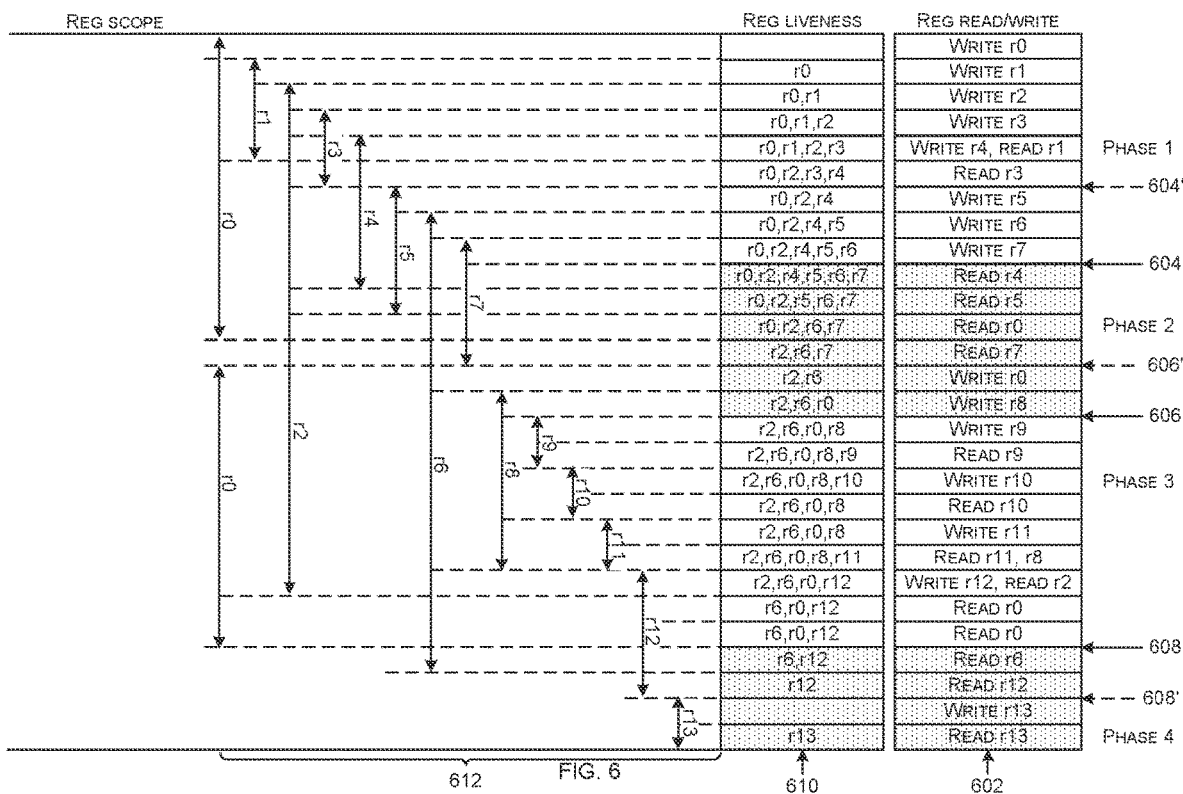
FIG. 6 shows a further example program that has been divided into four phases through the identification of three phase boundaries.

FIG. 6 shows an example program 602 that has been divided into four phases through the identification of three phase boundaries 604-608. FIG. 6 also shows which registers are live at each point in the code and after the execution of the read/write (column 610) and arrows 612 show the scope of each register (i.e. the periods when it is live). Consequently if you suspend the program after instruction/row X, then the temporary registers that need to be stored are those in the register liveness column 610 from the row below (i.e. row X+1). In the example shown in FIG. 6, there are 6 temporary registers that are live at the first phase boundary 604 (r0, r2, r4, r5, r6, r7), 4 temporary registers that are live at the second phase boundary 606 (r0, r2, r6, r8) and 2 temporary registers that are live at the third phase boundary 608 (r6, r12) and there are a total of 8 temporary registers that are live at any of the phase boundaries in the program (r0, r2, r4, r5, r6, r7, r8, r12). These phase boundaries 604, 606, 608 may, for example, be placed based on the position of instructions with a potential to be followed by a long delay, e.g. DISCARD, OBW and DS fences (where these instructions are not shown in FIG. 6).

In various examples, the position of phase boundaries in a task may be moved in order to reduce the number of temporary registers that are live at any phase boundary. In an example of this, the example described above with reference to FIG. 6 can be modified. If the first phase boundary 604 is moved three positions (e.g. three instructions) earlier in the code (to the position marked with the dotted arrow 604'), then the number of temporary registers that are live at that phase boundary is reduced to 3 (r0, r2, r4), if the second phase boundary 606 is moved two positions earlier in the code (to the position marked with the dotted arrow 606'), then the number of temporary registers that are live at that phase boundary is reduced to 2 (r2, r6) and if the third phase boundary 608 is moved two positions later in the code (to the position marked with the dotted arrow 608'), then the number of temporary registers that are live at that phase boundary is reduced to zero, bringing the overall total number of temporary registers that are live at any of the phase boundaries in the program down to four (r0, r2, r4, r6).

As described above, the position of a phase boundary within a program may be identified by the addition of a special instruction, referred to herein as a PHASE instruction, and this may be added by a compiler when the program is compiled.

A second example method of managing resources within a GPU pipeline can be described with reference to FIG. 7, where in this example the resources are temporary registers. In this method, the temporary registers allocated to a task at any point in time (during the execution of the task) are dependent upon the position of any phase boundaries in the task and the number of temporary registers allocated to a task at any point in time is lower than if this method is not used. In particular, the temporary registers allocated to a task are divided into two parts: a static allocation which relates to the entire task and a dynamic allocation which relates to the particular phase of the task that is being executed. The static allocation comprises those temporary registers which are live at any phase boundary in the program and the dynamic allocation for a phase comprises those temporary registers which are live within the particular phase being executed (but are not live at the phase boundary). Each of the temporary registers used by a task are therefore categorised as being static or dynamic and where they are dynamic they fall within the dynamic allocation and where they are static they fall within the static allocation.

Figure 7:
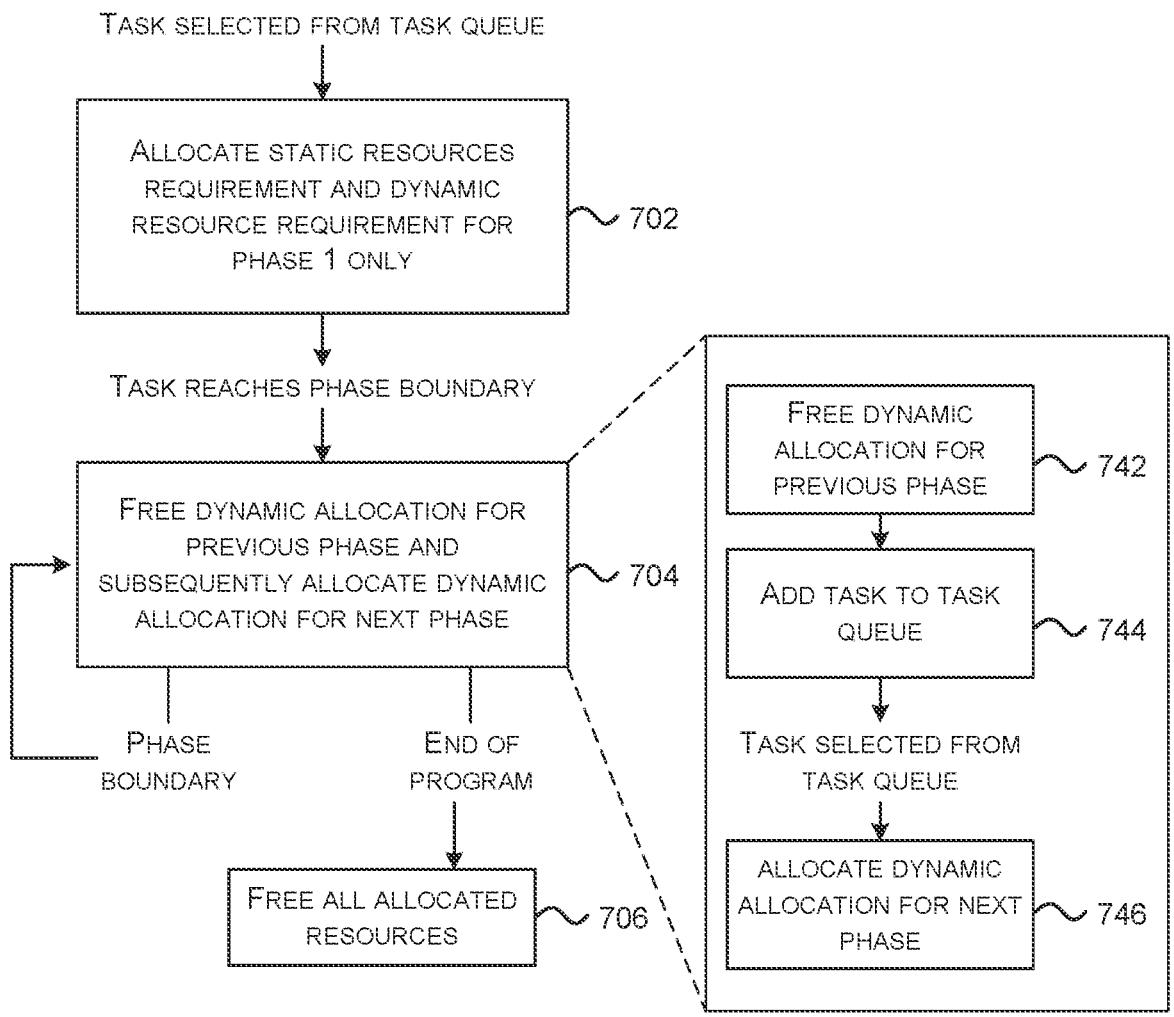
FIG. 7 shows a second example method of managing resources within a GPU pipeline.

As shown in FIG. 7, when a task is selected from the task queue and resources are allocated to the task (so that it can become READY), the task is allocated its static allocation of temporary registers and the dynamic allocation of temporary registers for the first phase (phase 1) only (block 702). When the task subsequently reaches the first phase boundary, the dynamic allocation for the first phase is freed (i.e. de-allocated) and the dynamic allocation for the next phase (phase 2) is subsequently allocated (block 704). This may involve moving the task back to the task queue (block 744) between the de-allocation (block 742) and new allocation (block 746), e.g. if the allocation of temporary registers can only occur for tasks selected from a task queue. The task queue that the task is added to, following the de-allocation of the temporary registers from the first phase, may be the standard task queue (e.g. task queue 401 in FIG. 4) or may be a high priority task queue (e.g. to minimise the delay between the de-allocation of temporary registers from one phase and the allocation of temporary registers for the next phase). If there is more than one phase boundary in the task, when the task reaches the next phase boundary, the method repeats, with the dynamic allocation for the phase that has just ended being freed (i.e. de-allocated) and the dynamic allocation for the next phase being subsequently allocated (block 704). Once the task reaches the end of the program, all of the allocated temporary registers (i.e. both the static and dynamic allocations) are freed (block 706).

As described above, the method of FIG. 7 may be implemented within the TSU 108. For example, the scheduler 116 (in the TSU 108) may allocate resources (in blocks 702, 704, 746) as well as adding tasks to the task queue (in block 744). The freeing of allocations (in blocks 704, 706, 742) may be performed by the scheduler 116 and/or by other hardware within the TSU 108. For example, allocations may be freed by various hardware elements working together, e.g. the scheduler 116 along with additional hardware logic within the TSU 108 (e.g. a conditional execution unit pipeline) and hardware logic external to the TSU but within the GPU pipeline 100 (e.g. a hardware logic unit which is located between the tag buffer 114 and the TSU 108).

A contiguous block of temporary registers is allocated for the static allocation and a second contiguous block of temporary registers is allocated for the dynamic allocation for the first phase (in block 702). Similarly, a contiguous block of temporary registers is subsequently allocated for the dynamic allocation for the next phase (in block 704).

The allocation of the static and dynamic allocations to a task initially (in block 702) to allow the task to enter the READY state (and hence be able to be selected for execution) is atomic, i.e. the task is either allocated both the static allocation and dynamic allocation for the first phase or is not allocated any temporary registers (and hence does not enter the READY state). The allocation is atomic so that resources are used efficiently, e.g. such that a task that cannot be executed because its dynamic allocation cannot be allocated does not prevent another task (which can execute) as a consequence of allocation of its static allocation. Consequently, the allocation (in block 702) can only occur when there are sufficient free resources to allocate both the static allocation for the task and the dynamic allocation for the first phase. The total number of temporary registers that are allocated to the task at the start of the method (in block 702) is no greater than the total number of temporary registers required for execution of the entire task and in most cases will be smaller than this total number (e.g. because not all temporary registers will be live in the first phase).

Referring back to the example of FIG. 6 with the phase boundaries at positions 604, 606 and 608 shown by the solid arrows, if all the temporary registers are allocated at the start (as in known systems) then the task is allocated 14 temporary registers (r0-r13); however, if the method of FIG. 7 is used, the maximum number of temporary registers allocated to the task at any time is 11 as shown below:

| Phase | Static allocation | Dynamic allocation | Total allocation |
|---|---|---|---|
| 1 | 8 | 2 (r1, r3) | 10 |
| 2 | (r0, r2, r4, r5, | 0 | 8 |
| 3 | r6, r7, r8, r12) | 3 (r9, r10, r11) | 11 |
| 4 | | 1 (r13) | 9 |

Referring back to the example of FIG. 6 with the phase boundaries at positions 604', 606' and 608' shown by the dotted arrows, if all the temporary registers are allocated at the start (as in known systems) then the task is allocated 14 temporary registers (r0-r13); however, if the method of FIG. 7 is used, the maximum number of temporary registers allocated to the task at any time is 10 as shown below:

| Phase | Static allocation | Dynamic allocation | Total allocation |
|---|---|---|---|
| 1 | 4 | 2 (r1, r3) | 6 |
| 2 | (r0, r2, r4, r6) | 2 (r5, r7) | 6 |
| 3 | | 5 (r8, r9, r10, r11, r12) | 9 |
| 4 | | 1 (r13) | 5 |

As a consequence of the reduced allocation at the outset (in block 702), tasks are able to start execution earlier (or at least enter a READY state earlier and be available for selection for execution earlier). This is because fewer temporary registers need to be available for allocation to the task.

The method of FIG. 7 improves the utilisation of the TSU 108 particularly where the tasks being executed make heavy use of the temporary registers (i.e. the tasks use the temporary registers a lot) and hence they are in short supply.

The static allocation of temporary registers and the dynamic allocations of temporary registers may be allocated from a common pool of registers or from two different pools (or collections) of registers, e.g. from pools of registers in different physical storages (e.g. different RAMs). By allocating the static allocation and the dynamic allocations from different pools of registers, it prevents deadlock from occurring where a task from one pass (pass B) has a sequential dependency on a task from the previous pass (pass A). This is because the static allocations, which are held for the entirety of the task, cannot interfere with the dynamic allocations, which are only held for the relevant phase of the task.

An alternative solution to the deadlock, where the static allocation and the dynamic allocations are allocated from the same pool of registers, is to provide one or more rules that define when the method of FIG. 7 may be used and when it should be disabled (i.e. such that tasks are not split into phases and there is only one allocation for all registers for the entirety of the task). This analysis may be performed offline (e.g. by parsing the shader to determine allocations) and the rules may, for example, be defined based on the number of registers in the calculated static allocation, $R_{static}$, the total number of temporary registers that are available in the system, $R_{total}$, and the maximum number of tasks that can be mapped, $T_{max}$ (which is a hardware limit). A rule may be defined so as to ensure that following any allocation there are always enough unallocated temporary registers for at least one maximum-sized dynamic allocation, $R_{dynamic\_max}$ and this results in the rule that the method of FIG. 7 is enabled where $R_{statics} \leq (R_{total} - R_{dynamic\_max})/T_{max}$. In some examples, $R_{dynamic\_max} = 256$. However, deadlock may still occur where such rules are used because fragmentation may prevent allocation of a large enough block of contiguous temporary registers.

In a variation of the method shown in FIG. 7 and described above, the method may initially allocate the static requirement and the dynamic requirements for all the phases of the task. Then, when a task reaches a phase boundary, the dynamic allocation for the completed phase is freed, but no further allocation is required. This avoids the need for the task to return to the task queue at each phase boundary and reduces the amount of allocated resources (compared to known allocation techniques) as the task progresses, but the initial allocation is not reduced.

By adjusting the position of the phase boundaries, the granularity with which temporary registers are allocated may be adjusted. If temporary registers are allocated in smaller groups, then it takes less time to perform the allocation, and the delay prior to allocation is likely to be smaller; however allocation is performed more often than for larger groups of temporary registers.

The method described above with reference to FIG. 7 may be used independently or in combination with any of the other methods described herein (e.g. any of the methods described above with reference to FIGS. 3-5). Where the two methods are used in combination with each other, i.e. where tasks are suspended at phase boundaries (or conditionally suspended at phase boundaries) and de-allocation and allocation of the dynamic allocation of temporary registers also occurs at phase boundaries, the criteria used to place phase boundaries may be the same or different to those used where either the methods of FIGS. 3-5 and the method of FIG. 7 are used independently.

Where the methods described herein are used together, phase boundaries within a program (e.g. within a shader program) may be defined initially at points in the code that are followed by delays which are long or potentially long (e.g. longer than average actual or potential delays). As described above, these initial points may, for example, be after high-latency instructions (e.g. texel fetch operations and instructions with a de-scheduling fence, where these are used) and/or where the program waits for sequential dependencies (SDs) and fences to clear, e.g. before output buffer writes (OBW) and DISCARD instructions. Following this initial definition, the position of one or more of the phase boundaries may, if certain criteria are met, be modified to a position earlier in the code if this reduces the number of live registers at the phase boundary or if it reduces the number of static registers overall (i.e. the number of registers that are live at any phase boundary in the program). Dependent upon the reason for the placement of a phase boundary, it may not be possible to move some phase boundaries. In various examples, only a subset of phase boundaries may be considered for adjustment, following their initial definition and this may be dependent upon the reason for the initial placement. For example, where a phase boundary is initially placed before a DS fence, the code may then be scanned upwards to identify the last texture sampling (SMP) operation in a texture sampling island (where this island comprises block of instructions between the instruction that set the fence and the instruction that waits on the fence, where the instructions in the block do not consume the data that is being fenced) and the phase boundary may be moved to following this last texture sampling instruction if this reduces the number of live registers at the phase boundary or if it reduces the number of static registers overall (i.e. the number of registers that are live at any phase boundary in the program).

A third example method of managing resources within a GPU pipeline, which is a combination of the methods of FIGS. 3 and 7, can be described with reference to FIG. 8. When a task reaches a phase boundary, the dynamic allocation of temporary registers (for the phase that has just finished) is freed (block 801, cf. block 702) and the task is suspended (block 802, cf. block 302). As described above, when a task is in a suspended state, it not in the same state as a de-scheduled task because a de-scheduled task retains all the resources that were allocated to the task prior to its execution, whereas many of the resources allocated to a task are freed (i.e. de-allocated) when the task is suspended (block 822, cf. block 322). The resources that are freed (in block 822) do not include the static allocation of temporary registers but do include any other resources allocated to the task such as storage for the task state (e.g. PC, task ID, counters and predicates etc. as described above).

When a task is suspended (in block 802), prior to freeing the allocated resources (in block 822), the execution state for the task is stored (block 824, cf. block 324). Storing the execution state (in block 824) comprises storing any state required to restart the task from the point after the phase boundary, such as data that records the progress of the task prior to suspension.

Figure 8:
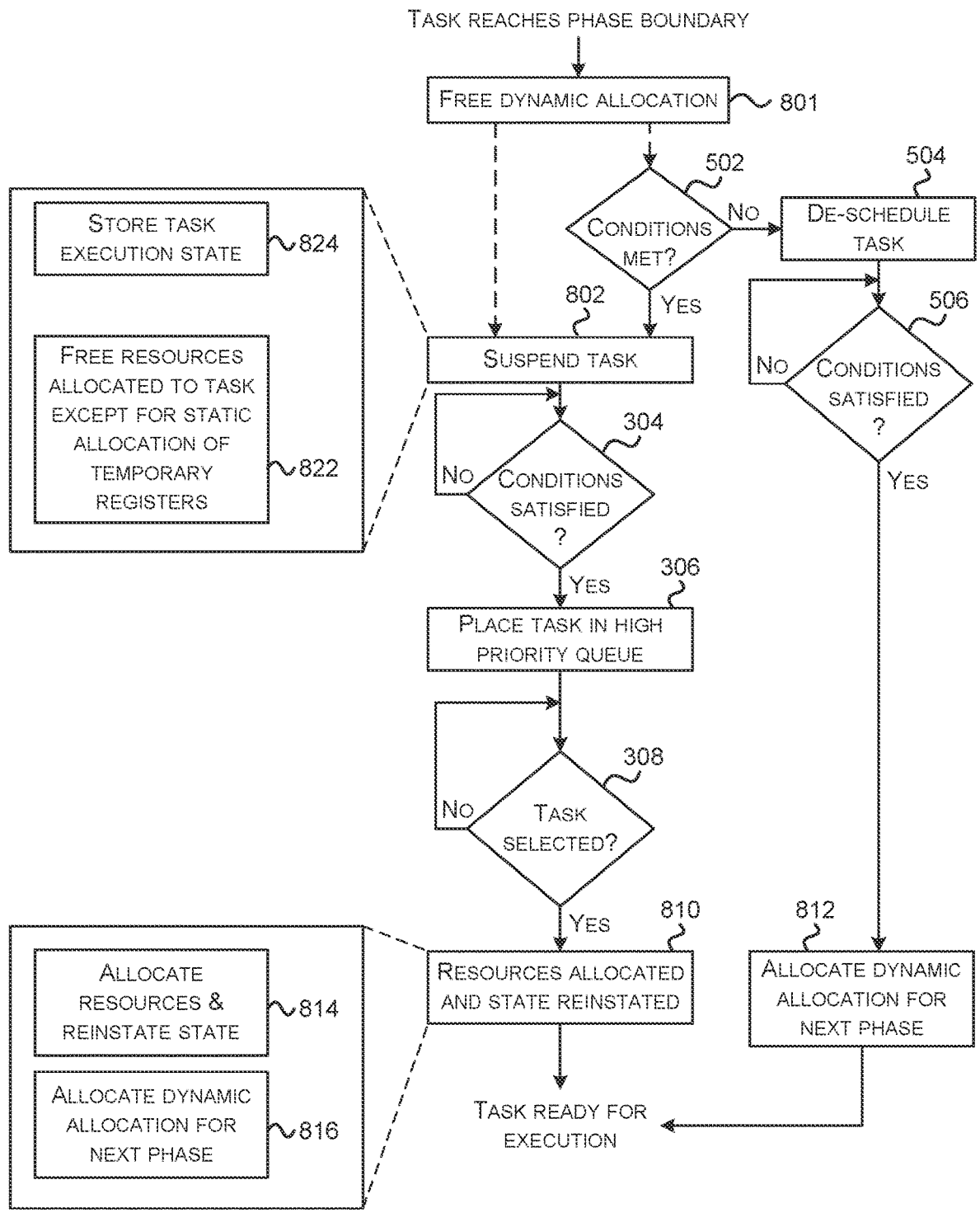
FIG. 8 shows a third example method of managing resources within a GPU pipeline.

In FIG. 8, for example, the instruction controller 118 (in the TSU 108) may determine whether suspension conditions are met (in block 502) and then suspend or de-schedule the task if required (in blocks 504, 802) including storing execution state where appropriate (in block 824). The scheduler 116 may determine whether to un-suspend a task (block 304) and the subsequent operations (blocks 306, 308, 810, 814, 816) and also whether conditions are satisfied to re-schedule a task (in block 506) and the subsequent operation (block 812). As described above, the freeing of resources (in blocks 801, 822) may be performed by the scheduler 116 and/or by other hardware within the TSU 108. For example, allocations may be freed by various hardware elements working together, e.g. the scheduler 116 along with additional hardware logic within the TSU 108 (e.g. a conditional execution unit pipeline) and hardware logic external to the TSU but within the GPU pipeline 100 (e.g. a hardware logic unit which is located between the tag buffer 114 and the TSU 108).

By using the combination of methods of FIGS. 3 and 7, there is less execution state to store (in block 824), compared to the use of the method of FIG. 3 without the method of FIG. 7, because the temporary registers that remain allocated to the task (i.e. the static allocation) are not freed. As a consequence of this, for a fixed amount of storage space for storing execution state (in block 824), a larger number of tasks can be placed into a suspended state where the method of FIG. 8 is used compared to where the method of FIG. 3 is used without the method of FIG. 7.

As described above with reference to FIG. 3, the task remains in the suspended state until pre-defined conditions are satisfied ('Yes' in block 304). The particular conditions that need to be satisfied for a task will depend on the nature of the phase boundary, e.g. they will depend upon the instruction that resulted in the phase boundary. For example, where the phase boundary is placed following an instruction to fetch data (e.g. a texture fetch), then the conditions (in block 304) will be satisfied when the data returns. Alternatively, where the phase boundary is placed where sequential dependencies need to clear (e.g. before a DISCARD or OBW instruction), then the conditions (in block 304) will be satisfied when the sequential dependencies is cleared.

As described above, as resources (aside from the static allocation of temporary registers) are freed when a task is suspended, there are more available resources for allocation to other tasks which are otherwise ready to be executed (e.g. all their sequential dependencies have been met) and this means that the freed resources can be used to place another task into the READY state and once a task is in the READY state, it can be selected for execution (and hence enter the ACTIVE state).

When the conditions are satisfied to restore a suspended task ('Yes' in block 304), the task cannot immediately commence execution, or be placed into the READY state, because it does not have all the required resources allocated to it. The task may be placed into a high-priority queue (block 306) such that resources are allocated to the task in preference to another task that has not yet started execution. When the task is selected from the high-priority queue ('Yes' in block 308), resources are allocated to the task and the task state is restored (block 810, cf. block 310) using the information that was previously stored (in block 824).

The resources that are allocated to the task (in block 810) include resources that store the task state (block 814) and the dynamic allocation of temporary registers for the next phase (block 816). At this point the task is placed into the READY state and can be selected for execution when there is capacity within the execution pipelines (e.g. when the number of tasks in the ACTIVE state falls below a pre-defined limit).

As described above, where a task is suspended (in block 302) as a consequence of a phase boundary that is immediately before a DISCARD or write to output buffer (OBW), once the task resumes execution, the DISCARD/OBW instruction can be executed immediately because the sequential dependency will have been met (as this has been checked before the task exited the suspended state, in block 304).

FIG. 8 also shows a fourth example method of managing resources within a GPU pipeline, which is a combination of the methods of FIGS. 5 and 7. As shown in FIG. 8, when a task reaches a phase boundary there may be an additional check (compared to the third example method, described above) to determine whether conditions are met to suspend, rather than de-schedule, the task (block 502). These conditions may, for example, be based on the current status of the execution pipelines in the TSU 108 (e.g. the current utilisation of the execution pipelines) and further examples are described above. If the conditions are satisfied ('Yes' in block 502), then the task is suspended (block 802) and the method continues as described above with reference to FIG. 8. If, however, the conditions are not satisfied ('No' in block 502), then the task is de-scheduled (block 504). This means that as soon as conditions are satisfied to re-schedule the task ('Yes' in block 506), e.g. data returns or a sequential dependency is met, the dynamic allocation of temporary registers for the next phase of the task is allocated (block 812) and then the task is immediately ready to be selected for execution. Unlike for a suspended task, where a task is de-scheduled, it retains the allocation of resources used to store the task state and so these do not need to be reallocated to the task before it can enter the READY state.

By using conditional suspension of tasks (block 502, as in FIGS. 5 and 8), this provides additional flexibility to improve the efficiency of operation of the TSU 108 dependent upon prevailing conditions within the GPU pipeline 100. As noted above, a de-scheduled task can return to execution more quickly than a suspended task and so if there are plenty of available resources (i.e. the system is not currently resource-constrained), tasks may be de-scheduled rather than suspended; however, if the resources become constrained and/or the utilisation of the execution pipelines falls (e.g. because of a lack of tasks in the READY state), then tasks may be suspended rather than de-scheduled.

Figure 9:
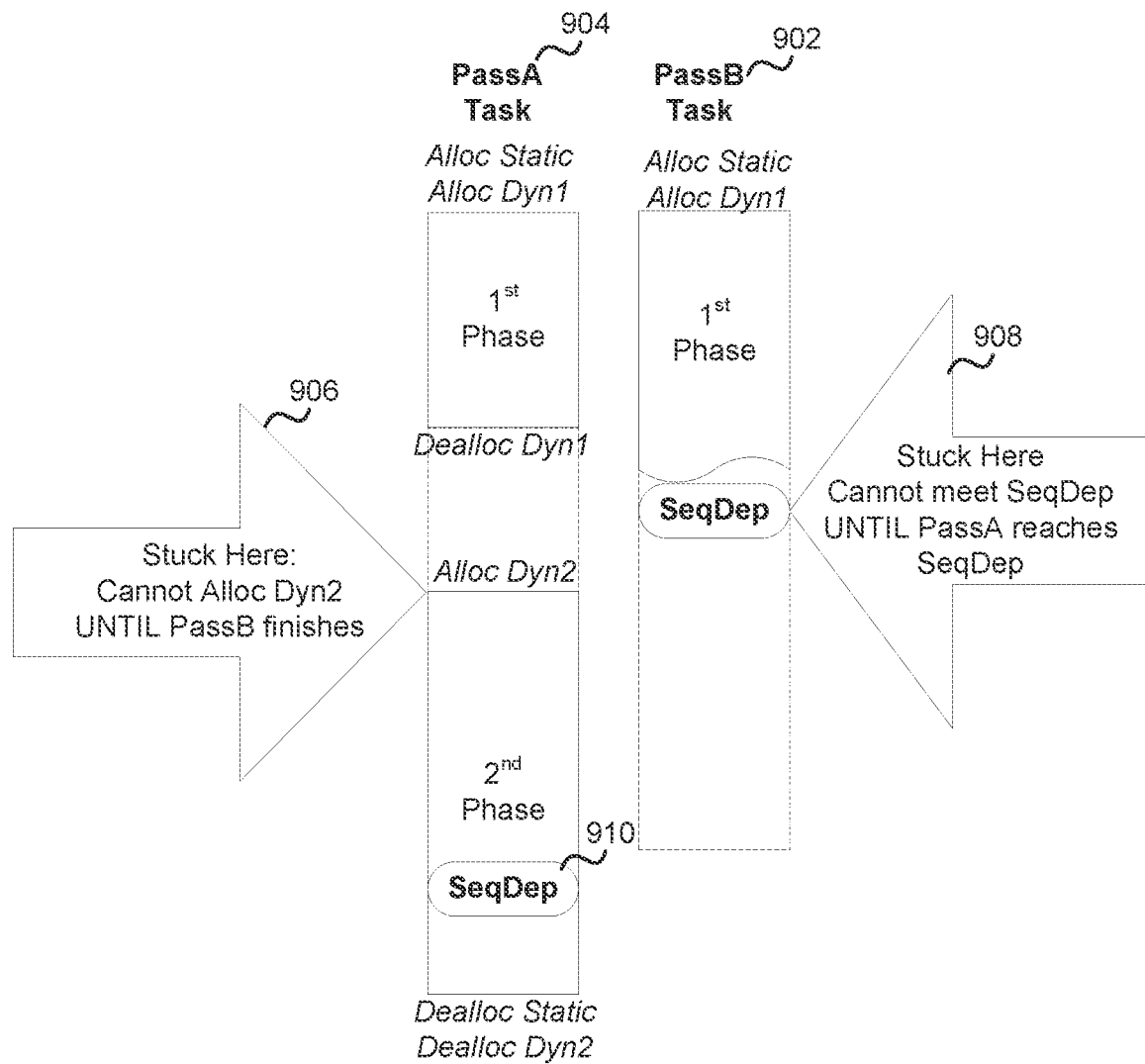
FIG. 9 is a schematic diagram showing an example deadlock situation.

As described above, one type of deadlock may be prevented by allocating the static allocation of temporary registers from a different pool of registers than the dynamic allocations of temporary registers. As shown in FIG. 9, if the registers are allocated from the same pool of resources and the static allocation of registers to the task 902 from the later pass (pass B) does not leave sufficient free registers to enable allocation of dynamic registers for a next phase (2nd phase) of the task 904 from the earlier pass (pass A), then that earlier task cannot progress (i.e. cannot execute the phase that requires the dynamic allocation of registers and hence is stuck at the point indicated by arrow 906 in FIG. 9) and the later task (from pass B) reaches a point (indicated by arrow 908 in FIG. 9) where it cannot progress because the sequential dependency has not been met. As shown in FIG. 9, in this example, the instruction 910 in the pass A task 904 that clears the sequential dependency condition is located after the request for the dynamic allocation which is blocked due to insufficient resource. In contrast, if the static allocation of temporary registers comes from a different pool of registers than the dynamic allocations, then the static allocation of registers to the task 902 from the later pass (pass B) cannot impact whether there are sufficient free registers to enable allocation of dynamic registers for the next phase (2nd phase) of the task 904 from the earlier pass (pass A). When the task 902 from the later pass reaches the point where it cannot progress (as indicated by arrow 908), its dynamic allocation is released, thereby enabling the task 904 from the earlier pass to progress.

The methods described above rely upon the presence of phase boundaries within a program. These phase boundaries, which may be identified by the position of a special instruction (e.g. a PHASE instruction) within the code, may be determined based on static analysis (e.g. offline analysis) of the code (e.g. by a compiler at compile-time) or may be determined dynamically (e.g. by the GPU pipeline 100 at run-time).

Figure 10:
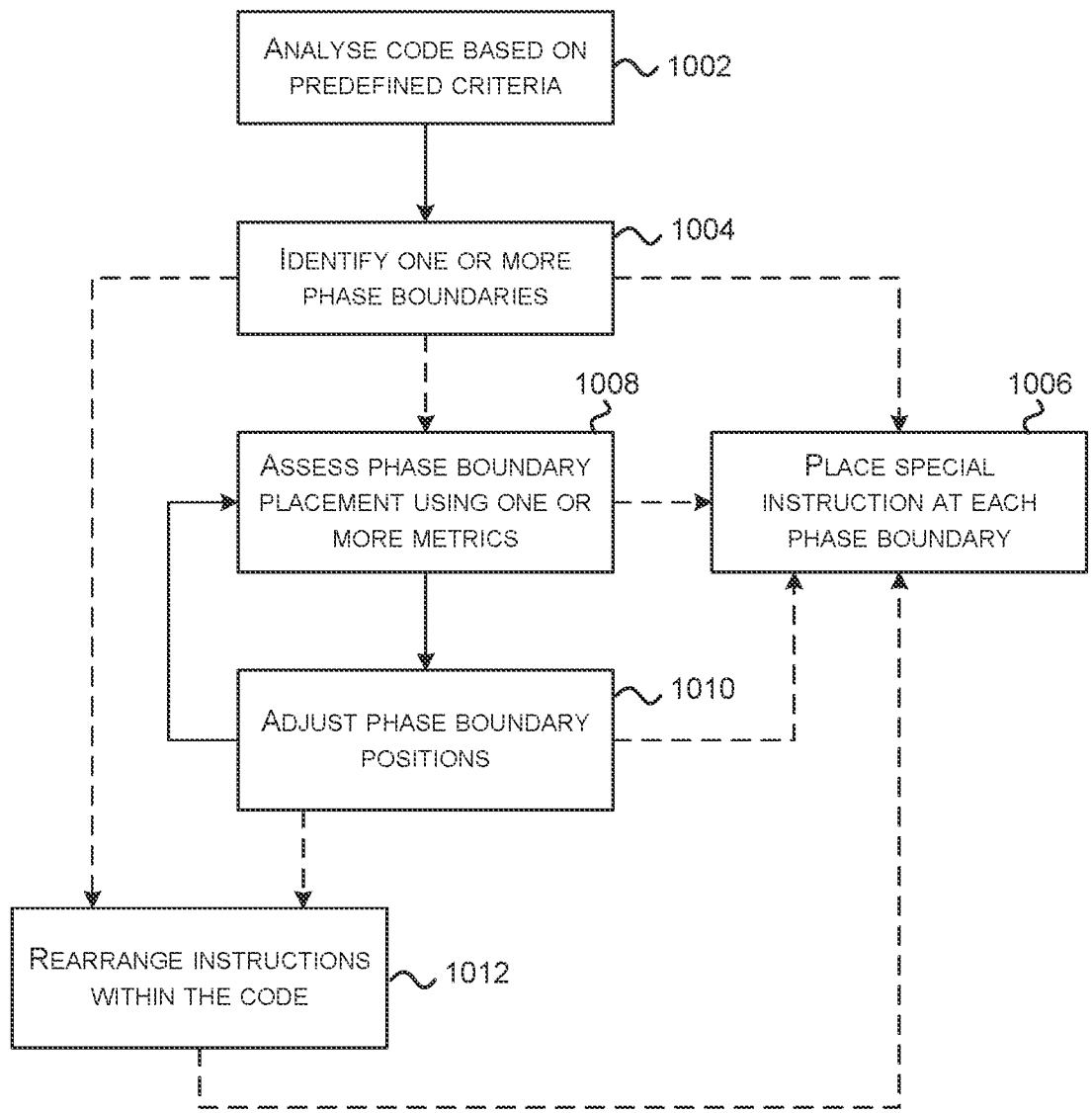
FIG. 10 is a flow diagram of an example method of dividing a program into a plurality of phases.

FIG. 10 is a flow diagram of an example method of dividing a program (e.g. a shader) into a plurality of phases. This method may, for example, be performed at compile-time by a compiler. As shown in FIG. 10, the method comprises receiving program code (e.g. shader code) and performing static analysis on the code using one or more pre-defined criteria (block 1002). These criteria may be based on instruction types or instruction characteristics, as described above with reference to the example in FIG. 2, or based on resource-usage of the program, such as the number of live registers at any point in the code, as described above with reference to the example in FIG. 6, or based on a combination of the two. Other criteria may be used in addition to, or instead of, either of these.

Based on the analysis, the position of one or more phase boundaries within the code are identified (block 1004) and these may be identified by the addition of a special instruction (block 1006) or in any other way such that it can be determined, at run-time when a task (which involves the execution of the program on one or more data-items) reaches a phase boundary.

In some examples, the method may further comprise assessing the initial placement of the phase boundaries using one or more metrics (block 1008), where these metrics may be associated with the criteria used to place the phase boundaries (in block 1002). For example, if the phase boundaries are placed to reduce the number of temporary registers that are live at a phase boundary (in block 1002), the associated metric that is used to assess the placement (in block 1008) may be the total number of registers that are live at any phase boundary. Alternatively, different criteria may be used to initially place the phase boundaries (in block 1004) and to assess the phase boundary placement (in block 1008). In an example, which combines both the instruction type criteria (of FIG. 2) and the resource-usage (or more particularly register-usage) criteria (of FIG. 6), the static analysis may be based on instruction type/characteristics (in block 1002) to initially place one or more phase boundaries (in block 1004) and then the number of live registers at each phase boundary may be used as the metric to subsequently assess the placement (in block 1008) and adjust the placement (in block 1010).

In such an example, a phase boundary position may initially be identified prior to DS fence; however, usually there is a block of instructions between the setting of a fence (which may be implemented by a field attached to an instruction, rather than a dedicated instruction) and the instruction that waits on it. Consequently, the position of the phase boundary may be moved upwards within the code (i.e. earlier in the code) from before the DS fence to somewhere after the instruction that sets the data fence, e.g. to a position where there are fewer live registers. This does not affect the operation of the code because the instructions in between (e.g. the instructions in the SMP island) are not dependent on the data that is fenced. In this way, the method serves reduce the size of the static allocation of registers (by reducing the number of registers that are live at the phase boundary).

Following the assessment (in block 1010), one or more phase boundary positions may be adjusted (block 1010). The process may involve feedback (as shown by the arrow from block 1010 back to block 1008) such that after the adjustment, the effect of the change is assessed (in block 1008) and the change can be maintained or reversed as a result. Furthermore, the method may iterate (i.e. the loop may be traversed more than once) to optimise placement of the phase boundaries.

In addition to, or instead of, adjusting the position of the phase boundaries (in block 1010), the method may comprise rearranging instructions within the code so that instructions before a phase boundary are instead placed after a phase boundary (or vice versa) as long as no dependencies are broken (block 1012). This rearrangement may be done, for example, to reduce the number of temporary registers that are live at the phase boundary or may be based on any other criteria. In addition, or instead, instructions that write to temporary registers may be duplicated, so that they occur both before and after a phase boundary, to reduce the number of temporary registers that are live at a phase boundary (and hence form part of the static allocation in the method of FIG. 7 or 8).

Figure 11:
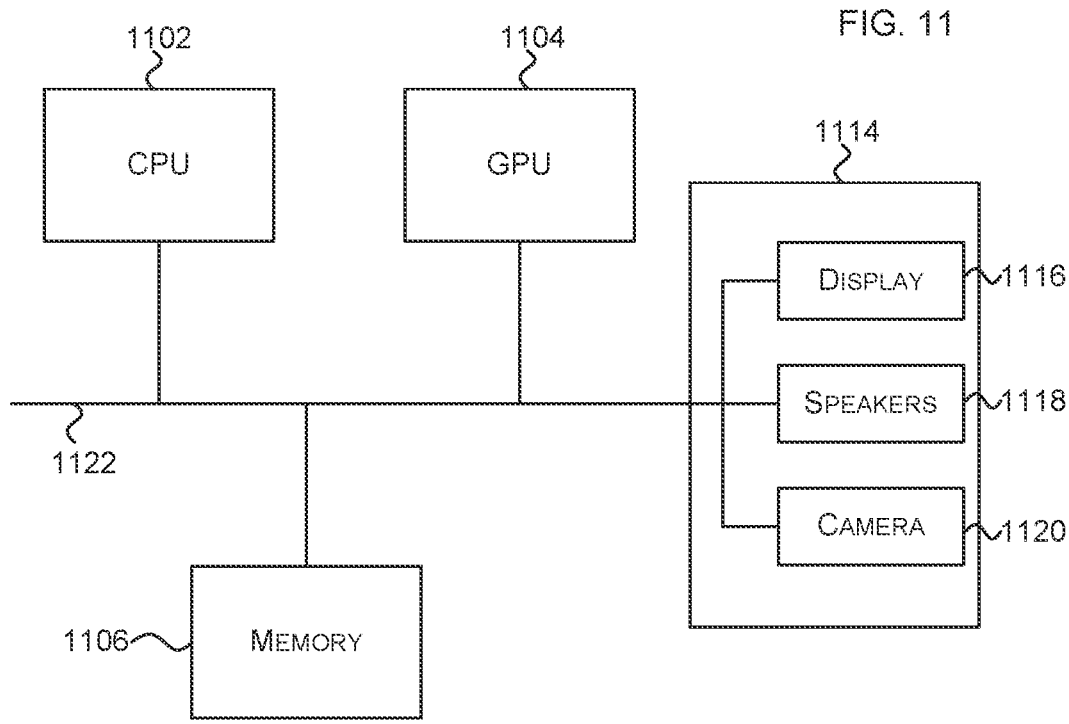
FIG. 11 shows a computer system in which the graphics pipeline of FIG. 1 may be implemented.

FIG. 11 shows a computer system in which the methods described herein may be implemented. The computer system comprises a CPU 1102, a GPU 1104, a memory 1106 and other devices 1114, such as a display 1116, speakers 1118 and a camera 1120. The GPU 1104 may comprise a pipeline (e.g. as shown in FIG. 1) that implements a method as described herein. The components of the computer system can communicate with each other via a communications bus 1122.

The system of FIG. 11 and the pipeline 100 of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the particular functional block at any point and may merely represent logical values which conveniently describe the processing performed by the system or pipeline between its input and output.

The graphics pipeline described herein may be embodied in hardware on an integrated circuit. The graphics pipeline described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics pipeline configured to perform any of the methods described herein, or to manufacture a graphics pipeline comprising any apparatus described herein. An integrated circuit definition dataset may be, for example, an integrated circuit description.

Therefore, there may be provided a method of manufacturing, at an integrated circuit manufacturing system, a graphics pipeline as described herein. Furthermore, there may be provided an integrated circuit definition dataset that, when processed in an integrated circuit manufacturing system, causes the method of manufacturing a graphics pipeline to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics pipeline will now be described with respect to FIG. 12.

Figure 12:
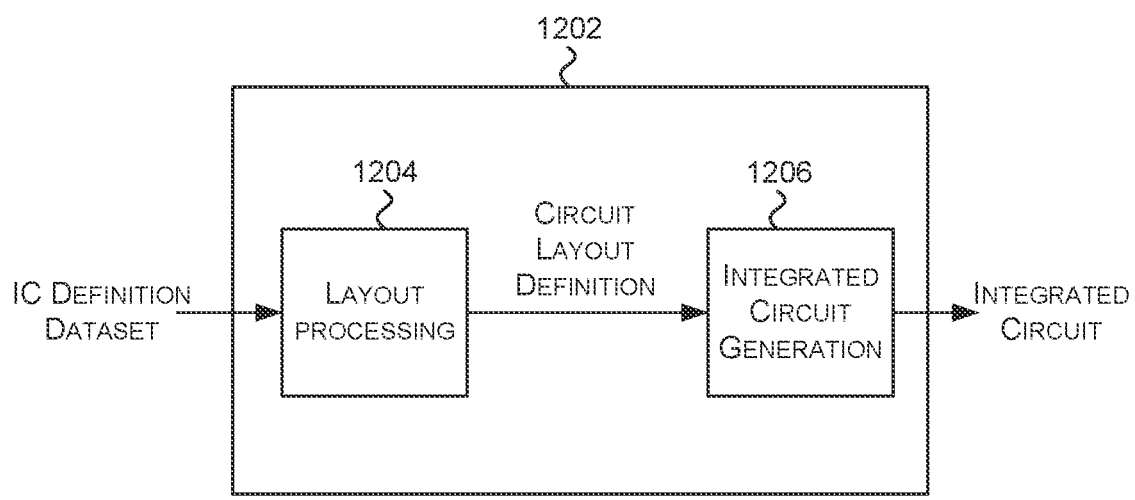
FIG. 12 shows an integrated circuit manufacturing system for generating an integrated circuit embodying a graphics pipeline as described herein.

FIG. 12 shows an example of an integrated circuit (IC) manufacturing system 1202 which is configured to manufacture a graphics pipeline as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a graphics pipeline as described in any of the examples herein), process the IC definition dataset, and generate an IC according to the IC definition dataset (e.g. which embodies a graphics pipeline as described in any of the examples herein). The processing of the IC definition dataset configures the IC manufacturing system 1202 to manufacture an integrated circuit embodying a graphics pipeline as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics pipeline without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of managing resources in a graphics processing pipeline, the method comprising:
   in response to selecting a task for execution within a texture/shading unit, allocating to the task both a static allocation of temporary registers for the entire task and a dynamic allocation of temporary registers for a first phase of the task, wherein the task executes a program comprising a plurality of phases; and
   when the task reaches a boundary between two phases, freeing the dynamic allocation of temporary registers, wherein the static allocation of temporary registers is not freed until the task has completed execution.

2. The method according to claim 1, further comprising, in response to selecting the task for execution within a texture/shading unit, allocating to the task a dynamic allocation of temporary registers for remaining phases of the task.

3. The method according to claim 2, wherein freeing the dynamic allocation of temporary registers comprises freeing the dynamic allocation for a first of the two phases.

4. The method according to claim 1, wherein the static allocation of temporary registers is allocated from a first group of temporary registers and the dynamic allocation of temporary registers is allocated from a second group of temporary registers, wherein the first and second groups of temporary registers do not overlap.

5. The method according to claim 1, further comprising:
   on completion of execution of the task, freeing the static allocation and any remaining dynamic allocation of temporary registers.

6. A method of sub-dividing a program into a plurality of phases, the method comprising:
   analysing instructions in the program and numbers of temporary registers that are live at different positions within the program when the program is executed to define positions of one or more phase boundaries within the program, wherein a temporary register is live if data has been written to it but has not yet been read for a last time; and
   for an identified phase boundary, inserting a phase instruction into the program.

7. A texture/shading unit for use in a graphics processing pipeline, the texture/shading unit comprising:
   hardware logic arranged in response to selecting a task for execution, to allocate to the task both a static allocation of temporary registers for the entire task and a dynamic allocation of temporary registers for a first phase of the task, wherein the task executes a program comprising a plurality of phases; and
   wherein the hardware logic is further arranged, when the task reaches a boundary between two phases, to free the dynamic allocation of temporary registers, wherein the static allocation of temporary registers is not freed until the task has completed execution.

8. The texture/shading unit according to claim 7, wherein the hardware logic comprises a scheduler and an instruction controller;
   wherein the scheduler is arranged, in response to selecting a task for execution, to allocate to the task a static allocation of temporary registers for the entire task and a dynamic allocation of temporary registers for a first phase of the task; and
   wherein the instruction controller is arranged to free the dynamic allocation of temporary registers when the task reaches a boundary between two phases.

9. The texture/shading unit according to claim 7, wherein the hardware logic is further arranged, in response to selecting the task for execution within a texture/shading unit, to allocate to the task a dynamic allocation of temporary registers for remaining phases of the task.

10. The texture/shading unit according to claim 9, wherein the hardware logic is further arranged, when the task reaches the boundary between two phases, to free the dynamic allocation for a first of the two phases.

11. The texture/shading unit according to claim 7, wherein the static allocation of temporary registers is allocated from a first group of temporary registers and the dynamic allocation of temporary registers is allocated from a second group of temporary registers, wherein the first and second groups of temporary registers do not overlap.

12. The texture/shading unit according to claim 7, wherein the hardware logic is further arranged, on completion of execution of the task, to free the static allocation and any remaining dynamic allocation of temporary registers.

13. The texture/shading unit according to claim 7, wherein the texture/shading unit is embodied in hardware on an integrated circuit.

14. A graphics processing system comprising the texture/shading unit as set forth in claim 7.

15. A non-transitory computer readable storage medium having stored thereon a computer readable dataset description of an integrated circuit that, when processed in an integrated circuit manufacturing system, causes the integrated circuit manufacturing system to manufacture a graphics processing system as set forth in claim 14.

16. A non-transitory computer readable storage medium having stored thereon computer readable code configured to cause the method as set forth in claim 1 to be performed when the code is run.

17. A method of manufacturing, at an integrated circuit manufacturing system, the texture/shading unit as set forth in claim 7, comprising inputting to said integrated circuit manufacturing system a computer readable dataset description of said texture/shading unit, and causing said integrated circuit manufacturing system to manufacture said texture/shading unit.

18. An integrated circuit manufacturing system comprising:
   a non-transitory computer readable storage medium having stored thereon a computer readable integrated circuit dataset description that describes the texture/shading unit as set forth in claim 7;
   a layout processing system configured to process the integrated circuit description so as to generate a circuit layout description of an integrated circuit embodying the texture/shading unit; and an integrated circuit generation system configured to manufacture the texture/shading unit or graphics processing system comprising the texture/shading unit.

\* \* \* \* \*